US011862026B2

(12) United States Patent
Derginer et al.

(10) Patent No.: US 11,862,026 B2
(45) Date of Patent: *Jan. 2, 2024

(54) MARINE PROPULSION CONTROL SYSTEM AND METHOD WITH PROXIMITY-BASED VELOCITY LIMITING

(71) Applicant: Brunswick Corporation, Mettawa, IL (US)

(72) Inventors: Matthew E. Derginer, Butte des Morts, WI (US); Aaron J. Ward, Oshkosh, WI (US); Travis C. Malouf, Germantown, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/846,635

(22) Filed: Jun. 22, 2022

(65) Prior Publication Data

US 2022/0327936 A1 Oct. 13, 2022

Related U.S. Application Data

(63) Continuation of application No. 16/694,587, filed on Nov. 25, 2019, now Pat. No. 11,403,955.

(Continued)

(51) Int. Cl.
 *G08G 3/02* (2006.01)
 *G05D 1/02* (2020.01)
 *B63B 43/18* (2006.01)

(52) U.S. Cl.
 CPC ............... *G08G 3/02* (2013.01); *B63B 43/18* (2013.01); *G05D 1/0206* (2013.01)

(58) Field of Classification Search
 CPC .. G08G 3/00; G08G 3/02; G05D 1/02; G05D 1/0206; B63B 43/00; B63B 43/18

(Continued)

(56) References Cited

U.S. PATENT DOCUMENTS

| 6,234,100 B1 | 5/2001 | Fadeley et al. |
| 6,273,771 B1 | 8/2001 | Buckley et al. |

(Continued)

FOREIGN PATENT DOCUMENTS

| CA | 2279165 | 1/2001 |
| CA | 2282064 | 1/2001 |

(Continued)

OTHER PUBLICATIONS

European Search Report dated Apr. 29, 2020 in counterpart European Patent Application 19216250.1.

(Continued)

*Primary Examiner* — Lars A Olson
(74) *Attorney, Agent, or Firm* — Andrus Intellectual Property Law, LLP

(57) ABSTRACT

A propulsion control system on a marine vessel includes at least one propulsion device configured to propel the marine vessel and at least one proximity sensor system configured to generate proximity measurements describing proximity of objects surrounding the marine vessel. A control system is configured to receive the proximity measurements, access a preset buffer distance surrounding the marine vessel, calculate a velocity limit for the marine vessel in one or more directions of the objects based on a difference between the proximity measurements and the preset buffer distance surrounding the marine vessel so as to progressively decrease the velocity limit as the marine vessel approaches the preset buffer distance from any of the objects, and control the at least one propulsion device such that a velocity of the marine vessel does not exceed the velocity limit in the direction of any of the objects.

20 Claims, 7 Drawing Sheets

Related U.S. Application Data

(60) Provisional application No. 62/780,028, filed on Dec. 14, 2018.

(58) Field of Classification Search
USPC .................................................. 440/1
See application file for complete search history.

(56) References Cited

U.S. PATENT DOCUMENTS

| | | | |
|---|---|---|---|
| 7,267,068 B2 | 11/2007 | Bradley et al. | |
| 7,725,253 B2 | 5/2010 | Foxlin | |
| 8,195,381 B2 | 6/2012 | Arvidsson | |
| 8,622,778 B2 | 1/2014 | Tyers et al. | |
| 9,039,469 B1 | 5/2015 | Calamia et al. | |
| 9,183,711 B2 | 11/2015 | Fiorini et al. | |
| 9,355,463 B1 | 5/2016 | Arambel et al. | |
| 9,615,006 B2 | 4/2017 | Terre et al. | |
| 9,650,119 B2 | 5/2017 | Morikami et al. | |
| 9,729,802 B2 | 8/2017 | Frank et al. | |
| 9,734,583 B2 | 8/2017 | Walker et al. | |
| 9,778,657 B2 | 10/2017 | Tyers | |
| 9,878,769 B2 | 1/2018 | Kinoshita et al. | |
| 9,996,083 B2 | 1/2018 | Vojak | |
| 9,908,605 B2 | 3/2018 | Hayashi et al. | |
| 9,927,520 B1 | 3/2018 | Ward et al. | |
| 9,988,134 B1 | 6/2018 | Gable et al. | |
| 10,037,701 B2 | 7/2018 | Harnett | |
| 10,048,690 B1 | 8/2018 | Hilbert et al. | |
| 10,055,648 B1 | 8/2018 | Grigsby et al. | |
| 10,106,238 B2 | 10/2018 | Sidki et al. | |
| 10,126,748 B2 | 11/2018 | Akuzawa et al. | |
| 10,191,153 B2 | 1/2019 | Gatland | |
| 10,191,490 B2 | 1/2019 | Akuzawa et al. | |
| 10,431,099 B2 | 1/2019 | Stewart et al. | |
| 10,272,977 B2 | 4/2019 | Hashizume et al. | |
| 10,281,917 B2 | 5/2019 | Tyers | |
| 10,338,800 B2 | 7/2019 | Rivers et al. | |
| 10,429,845 B2 | 10/2019 | Arbuckle et al. | |
| 10,444,349 B2 | 10/2019 | Gatland | |
| 10,507,899 B2 | 12/2019 | Imamura et al. | |
| 10,746,552 B2 | 8/2020 | Hashizume et al. | |
| 11,373,537 B2* | 6/2022 | Derginer | G05D 1/0206 |
| 11,403,955 B2* | 8/2022 | Derginer | G05D 1/0206 |
| 2003/0137445 A1 | 7/2003 | Rees et al. | |
| 2005/0075016 A1 | 4/2005 | Bertetti et al. | |
| 2006/0058929 A1 | 3/2006 | Fossen et al. | |
| 2007/0089660 A1 | 4/2007 | Bradley et al. | |
| 2011/0153125 A1 | 6/2011 | Arbuckle et al. | |
| 2011/0172858 A1 | 7/2011 | Gustin et al. | |
| 2014/0316657 A1 | 10/2014 | Johnson et al. | |
| 2015/0009325 A1 | 1/2015 | Kardashov | |
| 2015/0032305 A1 | 1/2015 | Lindeborg | |
| 2015/0089427 A1 | 3/2015 | Akuzawa | |
| 2015/0134146 A1 | 5/2015 | Pack et al. | |
| 2015/0172545 A1 | 6/2015 | Szabo et al. | |
| 2015/0276923 A1 | 10/2015 | Song et al. | |
| 2015/0288891 A1 | 10/2015 | Johansson et al. | |
| 2015/0294660 A1 | 10/2015 | Stokes et al. | |
| 2015/0375837 A1 | 12/2015 | Johnson et al. | |
| 2015/0378361 A1 | 12/2015 | Walker et al. | |
| 2016/0041039 A1 | 2/2016 | Olsson | |
| 2016/0069681 A1 | 3/2016 | Johnson et al. | |
| 2016/0070265 A1 | 3/2016 | Liu et al. | |
| 2016/0125739 A1 | 5/2016 | Stewart et al. | |
| 2016/0162145 A1 | 6/2016 | Rivers et al. | |
| 2016/0187140 A1 | 6/2016 | Clarke et al. | |
| 2016/0196653 A1 | 7/2016 | Grant et al. | |
| 2016/0214534 A1 | 7/2016 | Richards et al. | |
| 2016/0334794 A1 | 7/2016 | Johnson et al. | |
| 2016/0370187 A1 | 12/2016 | Gatland et al. | |
| 2017/0052029 A1 | 2/2017 | Ninomiya et al. | |
| 2017/0059705 A1 | 3/2017 | Stokes et al. | |
| 2017/0064238 A1 | 3/2017 | Kardashov | |
| 2017/0090021 A1 | 3/2017 | Sayer et al. | |
| 2017/0146642 A1 | 5/2017 | Stokes et al. | |
| 2017/0167871 A1 | 6/2017 | Johnson et al. | |
| 2017/0168159 A1 | 6/2017 | Gatland | |
| 2017/0176586 A1 | 6/2017 | Johnson et al. | |
| 2017/0184414 A1 | 6/2017 | Johnson et al. | |
| 2017/0205829 A1 | 7/2017 | Tyers | |
| 2017/0227639 A1 | 8/2017 | Stokes et al. | |
| 2017/0243360 A1 | 8/2017 | Schulte | |
| 2017/0253314 A1 | 9/2017 | Ward | |
| 2017/0277189 A1 | 9/2017 | Johnson et al. | |
| 2017/0285134 A1 | 10/2017 | Stokes et al. | |
| 2017/0300056 A1 | 10/2017 | Johnson et al. | |
| 2017/0365175 A1 | 12/2017 | Harnett | |
| 2017/0371348 A1 | 12/2017 | Mou | |
| 2018/0023954 A1 | 1/2018 | Rivers | |
| 2018/0050772 A1 | 2/2018 | Koyano et al. | |
| 2018/0057132 A1 | 3/2018 | Ward et al. | |
| 2018/0081054 A1 | 3/2018 | Rudzinsky et al. | |
| 2018/0259338 A1 | 9/2018 | Stokes et al. | |
| 2018/0259339 A1 | 9/2018 | Johnson et al. | |
| 2018/0292529 A1 | 10/2018 | Hogasten | |
| 2019/0098212 A1 | 3/2019 | Shain et al. | |
| 2019/0137618 A1 | 5/2019 | Hawker | |
| 2019/0251356 A1 | 8/2019 | Rivers | |
| 2019/0258258 A1 | 8/2019 | Tyers | |
| 2019/0283855 A1 | 9/2019 | Nilsson | |
| 2019/0299983 A1 | 10/2019 | Shalev-Shwartz et al. | |

FOREIGN PATENT DOCUMENTS

| | | |
|---|---|---|
| CN | 110325823 | 10/2019 |
| DE | 11 2013 004908 | 6/2015 |
| EP | 1 775 212 | 4/2007 |
| EP | 1873052 | 1/2008 |
| EP | 3 182 155 | 6/2017 |
| EP | 2824528 | 3/2019 |
| JP | 7-246998 | 10/1999 |
| JP | 2016049903 | 4/2016 |
| JP | 2017178242 | 10/2017 |
| KR | 20140011245 | 1/2014 |
| NO | 2019157400 | 8/2019 |
| WO | 9305406 | 3/1993 |
| WO | 2006040785 | 4/2006 |
| WO | 2006 062416 | 6/2006 |
| WO | 2008 066422 | 6/2008 |
| WO | 2012010818 | 1/2012 |
| WO | 2017 095235 | 6/2017 |
| WO | 2017167905 | 10/2017 |
| WO | 2017168234 | 10/2017 |
| WO | 2017205829 | 11/2017 |
| WO | 2018162933 | 9/2018 |
| WO | 2018172849 | 9/2018 |
| WO | 2018183777 | 10/2018 |
| WO | 2018201097 | 11/2018 |
| WO | 2018232376 | 12/2018 |
| WO | 2018232377 | 12/2018 |
| WO | 2019011451 | 1/2019 |
| WO | 2019096401 | 5/2019 |
| WO | 2019126755 | 6/2019 |
| WO | 2019157400 | 8/2019 |
| WO | 2019180506 | 9/2019 |
| WO | 2019201945 | 10/2019 |

OTHER PUBLICATIONS

John Bayless, Adaptive Control of Joystick Steering in Recreational Boats, Marquette University, Aug. 2017, https://epublications.marquette.edu/cgi/viewcontent.cgi?article=1439&context=theses_open.

W. Xu et al., "Internet of Vehicles in Big Data Era." in IEEE/CAA Journal of Automatica Sinica, vol. 5, No. 1, pp. 19-35, Jan. 2018, doi:10.1109/JAS.2017.7510736. (Year 2018).

An Autonomous Solar-Powered Marine Robitic Ibservatory for Permanent Monitoring of Large Areas of Shallow Water by I. Gonzalez-Reolid et al.; Sensors 2018, 18(10), 3497; https://doi.org/10.3390/s18103497 (Year 2018).

S. Reed and V.E. Schmidt, "Providing Nautical Chart Awareness to Autonomous Surface Vessel operations," Oceans 2016 MTS/IEEE

(56) References Cited

OTHER PUBLICATIONS

Monterery, 2016, pp. 1-8, doi: 10.1109/OCEANS.2016.7761472 (Year 2016).

* cited by examiner

MARINE PROPULSION CONTROL SYSTEM AND METHOD WITH PROXIMITY-BASED VELOCITY LIMITING

CROSS-REFERENCE TO RELATED APPLICATIONS

This application is a continuation of U.S. patent application Ser. No. 16/694,587, filed Nov. 25, 2019, which application was published on Jun. 18, 2020, as Publication No. 2020/0193840 in the English language. U.S. patent application Ser. No. 16/694,587 claims the benefit of priority to U.S. Patent Application Ser. No. 62/780,028, filed on Dec. 14, 2018, the contents of which are all hereby incorporated by reference in entirety.

FIELD

The present disclosure generally relates to propulsion control systems and methods for controlling propulsion of a marine vessel, and more specifically to propulsion control systems and methods that limit the velocity of the marine vessel in a direction of an object based on the proximity of that object.

BACKGROUND

The following U.S. patents are each incorporated herein by reference, in entirety:

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,267,068 discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 9,927,520 discloses a method of detecting a collision of the marine vessel, including sensing using distance sensors to determine whether an object is within a predefined distance of a marine vessel, and determining a direction of the object with respect to the marine vessel. The method further includes receiving a propulsion control input at a propulsion control input device, and determining whether execution of the propulsion control input will result in any portion of the marine vessel moving toward the object. A collision warning is then generated.

U.S. Patent Application Publication No. 2017/0253314 discloses a system for maintaining a marine vessel in a body of water at a selected position and orientation, including a global positioning system that determines a global position and heading of the vessel and a proximity sensor that determines a relative position and bearing of the vessel with respect to an object near the vessel. A controller operable in a station-keeping mode is in signal communication with the GPS and the proximity sensor. The controller chooses between using global position and heading data from the GPS and relative position and bearing data from the proximity sensor to determine if the vessel has moved from the selected position and orientation. The controller calculates thrust commands required to return the vessel to the selected position and orientation and outputs the thrust commands to a marine propulsion system, which uses the thrust commands to reposition the vessel.

U.S. Patent Application Publication No. 2018/0057132 discloses a method for controlling movement of a marine vessel near an object, including accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

U.S. Pat. No. 10,429,845 discloses a marine vessel is powered by a marine propulsion system and movable with respect to first, second, and third axes that are perpendicular to one another and define at least six degrees of freedom of potential vessel movement. A method for controlling a position of the marine vessel near a target location includes measuring a present location of the marine vessel, and based on the vessel's present location, determining if the marine vessel is within a predetermined range of the target location. The method includes determining marine vessel movements that are required to translate the marine vessel from the present location to the target location. In response to the marine vessel being within the predetermined range of the target location, the method includes automatically controlling the propulsion system to produce components of the required marine vessel movements one degree of freedom at a time during a given iteration of control.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

A propulsion control system on a marine vessel includes at least one propulsion device configured to propel the marine vessel and at least one proximity sensor system configured to generate proximity measurements describing a proximity of an object with respect to the marine vessel. The system further includes a controller configured to receive proximity measurements, access a preset buffer distance, and calculate a velocity limit in a direction of the object for the marine vessel based on the proximity measurements and the preset buffer distance so as to progressively decrease the velocity limit as the marine vessel approaches the object such that the marine vessel is maintained at least the preset buffer distance from the object.

A marine propulsion control method includes receiving proximity measurements measured by one or more proximity sensors on a marine vessel wherein the proximity measurements describe a proximity of an object. The control method further includes accessing a preset buffer distance and then calculating a velocity limit for the marine vessel in a direction of the object based on the proximity measurements and the preset buffer distance so as to progressively decrease the velocity limit as the marine vessel approaches the preset buffer distance from the object. The at least one propulsion device is then controlled such that a velocity of the marine vessel does not exceed the velocity limit in the direction of the object. In certain embodiments, the method may further include limiting user input authority over propulsion output in a direction of the object by at least one propulsion device to the velocity limit so as to maintain the marine vessel at least the buffer distance from the object. In certain embodiments, the velocity limit may include each of a positive x-direction velocity limit, a negative x-direction velocity limit, a positive y-direction velocity limit, and a negative y-direction velocity limit, and in certain embodiments may further include a positive yaw direction velocity limit and/or a negative yaw direction velocity limit.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
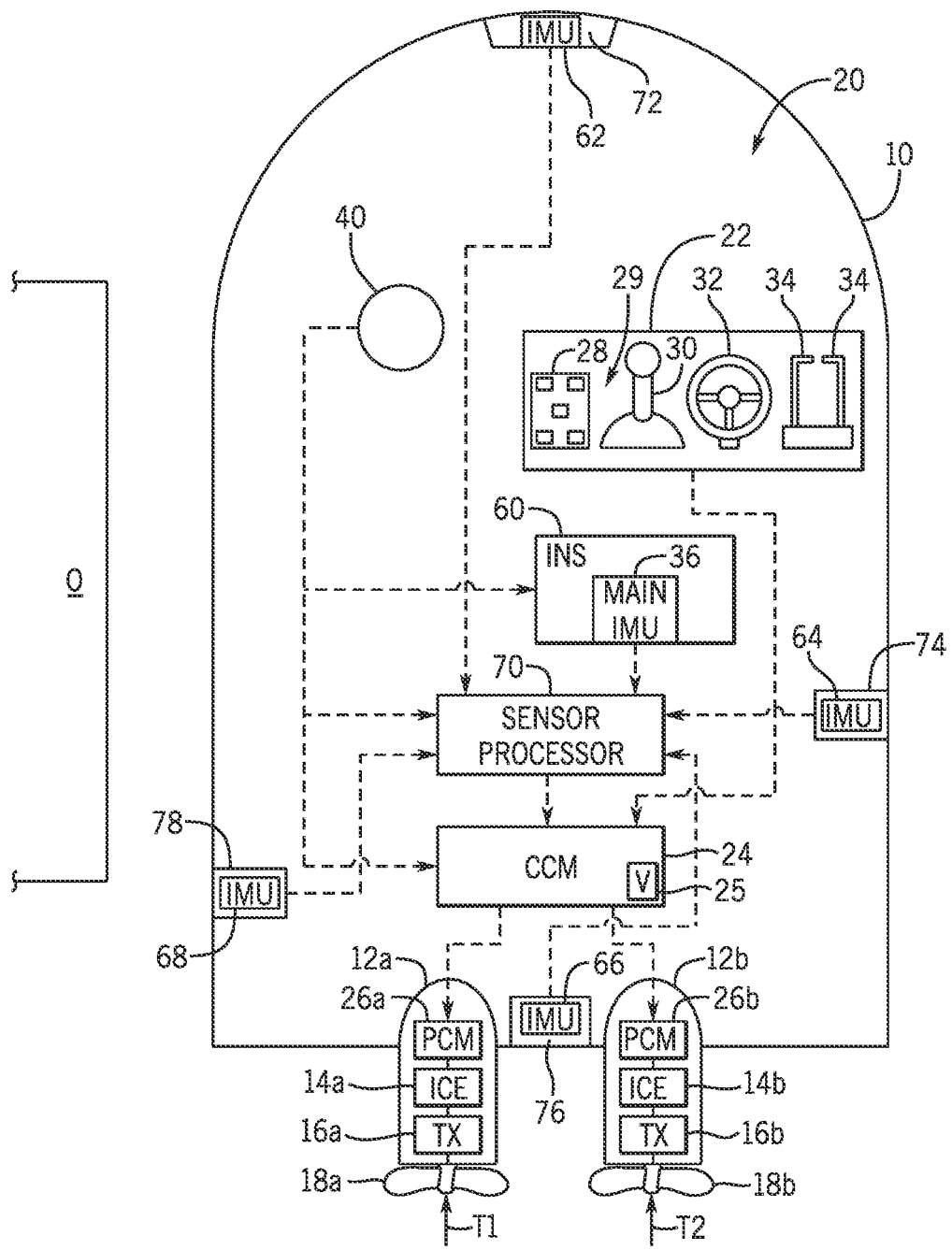
FIG. 1 is a schematic representation of an exemplary propulsion system on a marine vessel.

FIG. 1 shows a marine vessel 10 equipped with a propulsion control system 20 on a marine vessel 10 configured according to one embodiment of the disclosure. The propulsion control system 20 is capable of operating, for example, in a joysticking mode where a joystick is operated by a user to control vessel movement within an x/y plane, among other modes, as described hereinbelow. The propulsion system 20 has first and second propulsion devices 12a, 12b that produce first and second thrusts T1, T2 to propel the vessel 10. The first and second propulsion devices 12a, 12b are illustrated as outboard motors, but they could alternatively be inboard motors, stern drives, jet drives, or pod drives. Each propulsion device is provided with an engine 14a, 14b operatively connected to a transmission 16a, 16b, in turn, operatively connected to a propeller 18a, 18b.

The vessel 10 also houses various control elements that comprise part of the propulsion control system 20. The system 20 comprises an operation console 22 in signal communication, for example via a CAN bus as described in U.S. Pat. No. 6,273,771, with a controller 24, such as for example a command control module (CCM), and with propulsion control modules (PCM) 26a, 26b associated with the respective propulsion devices 12a, 12b. Each of the controller 24 and the PCMs 26a, 26b may include a memory and a programmable processor. As is conventional, each controller 24, 26a, 26b includes a processor communicatively connected to a storage system comprising a computer-readable medium that includes volatile or nonvolatile memory upon which computer readable code and data is stored. The processor can access the computer readable code and, upon executing the code, carry out functions, such as the navigation control functions and/or the proximity sensing functions, as described in detail below.

The operation console 22 includes a number of user input devices, such as a keypad 28, a joystick 30, a steering wheel 32, and one or more throttle/shift levers 34. Each of these devices inputs commands to the controller 24. The controller 24, in turn, communicates control instructions to the first and second propulsion devices 12a, 12b by communicating with the PCMs 26a, 26b. The steering wheel 32 and the throttle/shift levers 34 function in a conventional manner such that rotation of the steering wheel 32, for example, activates a transducer that provides a signal to the controller 24 regarding a desired direction of the vessel 10. The controller 24, in turn, sends signals to the PCMs 26a, 26b (and/or TVMs or additional modules if provided), which in turn activate steering actuators to achieve desired orientations of the propulsion devices 12a, 12b. The propulsion devices 12a, 12b are independently steerable about their steering axes. The throttle/shift levers 34 send signals to the controller 24 regarding the desired gear (forward, reverse, or neutral) of the transmissions 16a, 16b and the desired rotational speed of the engines 14a, 14b of the propulsion devices 12a, 12b. The controller 24, in turn, sends signals to the PCMs 26a, 26b, which in turn activate electromechanical actuators in the transmissions 16a, 16b and engines 14a, 14b for shift and throttle, respectively. A manually operable input device, such as the joystick 30, can also be used to provide control input signals to the controller 24. The joystick 30 can be used to allow the operator of the vessel 10 to manually maneuver the vessel 10, such as to achieve lateral translation or rotation of the vessel 10.

The propulsion control system 20 also includes one or more proximity sensors 72, 74, 76, and 78. Although one proximity sensor is shown on each of the bow, stern, port and starboard sides of the vessel 10, fewer or more sensors could be provided at each location and/or provided at other locations, such as on the hardtop of the vessel 10. The proximity sensors 72-78 are distance and directional sensors. For example, the sensors could be radars, sonars, cameras, lasers (e.g. lidars or Leddars), Doppler direction finders, or other devices individually capable of determining both the distance and direction (at least approximately), i.e.

the relative position of an object O with respect to the vessel 10, such as a dock, a seawall, a slip, another vessel, a large rock or tree, etc. The sensors 72-78 provide information regarding both a direction of the object with respect to the marine vessel 10 and a shortest distance between the object O and the vessel 10. Alternatively, separate sensors could be provided for sensing direction than are provided for sensing distance, or more than one type of distance/direction sensor can be provided at a single location on the vessel 10. The sensors 72-78 provide this distance and/or direction information to one or more controllers, such as to the sensor processor 70 and/or the CCM 24, such as by way of a dedicated bus connecting the sensors to a controller, a CAN bus, or wireless network transmissions, as described in more detail below.

Regarding the proximity sensors, 72, 74, 76, 78, note that different types of sensors may be used depending on the distance between the vessel 10 and the object O. For example, radar sensors may be used to detect objects at further distances. Once the vessel 10 comes within a particular distance of the object, lidar, ultrasonic, Leddar, or sonar sensors may instead be used. Camera sensors may be used, alone or in combination with any of the sensors mentioned above, in order to provide object proximity information to the CCM 24. Sensors are placed at positions on the vessel 10 so that they are at the correct height and facing direction to detect objects the vessel 10 is likely to encounter. Optimal sensor positions will vary depending on vessel size and configuration.

In FIG. 1, the proximity sensors are positioned at each of the front, sides, and stern of the vessel 10, and include front-facing sensor 72, starboard-facing sensor 74, rear-facing sensor 76, and port-facing sensor 78. In a different exemplary sensor arrangement, two proximity sensors may be placed on the hard top of the marine vessel 10 and arranged such that the fields of view of the two sensors, combined, cover the entire 360° area surrounding the vessel 10. Note also that the relevant controller, such as the sensor processor 70, may selectively operate any one or more of a plurality of sensors (including radars, lidars, Leddars, ultrasonics, and cameras) to sense the shortest distance and the direction of the object with respect to the vessel 10. Alternatively, the sensor processor may use all available sensor data from all sensor types, which may be reviewed real time as it is received or may be formulated into one or more maps or occupancy grids integrating all proximity measurement data, where the mapped data from all the operated sensors is processed as described herein. In such an embodiment, the proximity measurements from each of the various sensors are all translated into a common reference frame.

Autonomous and/or advanced operator assistance (i.e., semi-autonomous) controls for improved vessel handling qualities requires placement of multiple proximity sensors on the vessel 10. In general, these various types of proximity sensing devices (examples described above) are positioned to detect the presence of objects in the marine environment surrounding the marine vessel 10, such as a dock, swimmer, or other obstruction in the path of the vessel. Each sensor reports proximity relative to its own frame of reference—i.e. the distance from the sensor to the object as measured along the view angle of the sensor. Depending on the type of sensor, the application of use, boat size, hull shape, etc., multiple sensor types and sensor locations may be required to provide adequate proximity sensing around the marine vessel 10 for operation in all marine environments. To create a cohesive dataset that can be used for purposes of vessel control and vessel navigation, including autonomous vessel navigation and semi-autonomous control (such as automatic maneuver-limiting control), all of the data sources are preferably translated to a common reference frame. This requires precise knowledge of the location and orientation of each sensor relative to the common reference frame such that the data measured therefrom can be translated appropriately.

In the example of FIG. 1, a main inertial measurement unit (IMU) 36 is installed at a known location on the marine vessel with respect to a predefined point of navigation, such as the center of rotation (COR) or center of gravity (COG). The installation orientation or the main IMU 36 is also known. The installation locations of the main IMU 36 and each proximity sensor 72-78 are established as part of a calibration procedure for the proximity sensing system.

Referencing the example in FIG. 1, the main IMU 36 may be part of an inertial navigation system (INS) such as including one or more micro-electro-mechanical systems (MEMS). For example, the INS 60 may consist of a MEMS angular rate sensor, such as a rate gyro, a MEMS accelerometer, and a magnetometer. Such INS systems are well known in the relevant art. In other embodiments, the motion and angular position (including pitch, roll, and yaw) may be sensed by a differently configured INS 60, or by an attitude heading reference system (AHRS) that provides 3D orientation of the marine vessel 10 by integrating gyroscopic measurements, accelerometer data, and magnetometer data.

The INS 60 receives orientation information from the main IMU 36 and may also receive information from a GPS receiver 40 comprising part of a global positioning system (GPS). The GPS receiver 40 is located at a pre-selected fixed position on the vessel 10, which provides information related to global position of the marine vessel 10. The main IMU 36 is also located at a known and fixed position with respect to the center of navigation determined for the marine vessel 10, such as the COR or COG.

In FIG. 1 an IMU 62-68 is co-located with each proximity sensor 72-78. These sensor IMUs 62-68 may be configured similarly to the main IMU, such as each comprising a rate gyro, an accelerometer, and a magnetometer and producing corresponding IMU data. The IMU data from each sensor IMU 62-68 may be used for various purposes, such as for automatic calibration and verification of the proximity sensor system, for angular measurements used to interpret the proximity measurements by the relevant proximity sensor 72-78, and/or as backup IMUs in case of fault or failure of the main IMU 36.

The inventors have recognized unique problems presented by autonomous and semi-autonomous vessel control systems for operating in marine environments where marine vessels have additional degrees of freedom of movement compared to automotive applications—for example, they can effectuate only lateral and yaw movement without any forward or reverse movement (e.g., in a joysticking mode). Additionally, marine environments pose unique external environmental factors acting on the marine vessel, such as current, wind, waves, or the like. The present inventors have recognized that autonomous and semi-autonomous control systems for marine vessels need to be "aware" of relevant vessel acceleration limits to avoid colliding with obstacles. By knowing the acceleration limit, and by having an awareness of the distance range to obstacles, the control system can determine a maximum vessel velocity that can be realized where the control system has the ability to avoid colliding with known obstacles. The acceleration limit is the maximum acceleration a vessel can reach for both speeding up and slowing down, where maximum deceleration of a marine vessel is accomplished by effectuating a maximum acceleration in the opposite direction.

The inventors have recognized that the above-mentioned operational challenges posed by a marine environment can be effectively dealt with by establishing and maintaining a buffer distance around the marine vessel, where the control authority provided to a user is limited based on the buffer distance. For example, the propulsion control system may continuously calculate a maximum velocity, or velocity limit, for the marine vessel as it approaches an object O, and may limit a user's authority in controlling propulsion of the marine vessel 10 such that the propulsion system will not effectuate a thrust that will cause the marine vessel to travel toward the object at a velocity that is greater than the velocity limit. Thus, the propulsion system does not respond to, or carry out, commands that would cause the vessel to violate the buffer distance and venture too close to an object. In certain embodiments, the propulsion control system may be configured to automatically maintain a predetermined buffer distance between the marine vessel 10 and an object O, such as to automatically effectuate propulsion controls in order to force the marine vessel 10 away from a marine object O when the buffer zone is violated.

Figure 2:
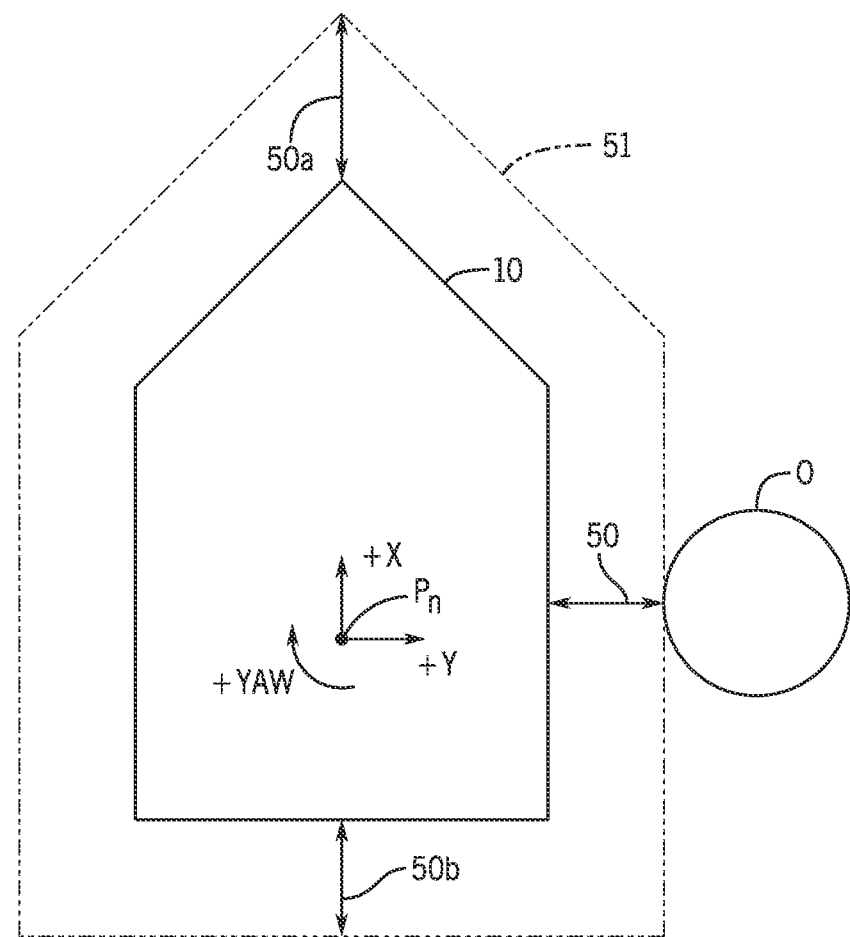
FIG. 2 schematically illustrates one implementation of a buffer distance maintained between a marine vessel and an object according to one embodiment of the present disclosure.

FIG. 2 is a diagram exemplifying this concept, where the marine vessel 10 is maintained at least the predetermined buffer distance 50 from the object O. A buffer zone 51 around the marine vessel 10 is defined, and velocity limits are calculated in order to progressively decrease the vessel velocity as it approaches the preset buffer distance 50 from the object O. In the depicted embodiment, the buffer zone 51 is established at a preset buffer distance 50 that is equal around all sides of the marine vessel. In certain embodiments, the buffer zone 51 may be asymmetrical with respect to the marine vessel, such as to provide a greater buffer distance 50a at the front side of the marine vessel than the buffer distance 50b on the rear side of the marine vessel. Similarly, a buffer distance on the starboard and port sides of the marine vessel 10 may be set the same or different than the front and rear buffer distances 50a, 50b.

The autonomous or semi-autonomous control algorithms, such as effectuated by the controller 24 include velocity control software performing algorithms to calculate a maximum velocity for the marine vessel 10 as it approaches an object O and effectuates velocity limits accordingly. In one embodiment, the velocity limits may be calculated based on a known maximum acceleration for the marine vessel. The maximum acceleration for the marine vessel may be based on the maximum vessel capabilities, such as the maximum positive or negative acceleration that can be effectuated by the propulsion system on the marine vessel 10 in the relevant direction of travel. Alternatively or additionally, the maximum acceleration for the marine vessel 10 may be predetermined, such as based on handling, comfort, or safety metrics.

The velocity limit, then, may be calculated based on that known acceleration limit based on the distance of an object O from the marine vessel 10, accounting for the buffer distance 50. Given that acceleration is the derivative of velocity, the relationship between a maximum acceleration for the marine vessel and a maximum velocity with respect to a distance to an object can be provided according to the following:

$$a_{max} = \frac{v_{max} - v_{final}}{\Delta r / v_{max}}$$

wherein $\Delta r$ is the allowable range to an object, which will be the measured distance to an object minus the predetermined buffer distance, and wherein $a_{max}$ is the known maximum acceleration for the marine vessel, and wherein $v_{final}$ is the velocity reached at the point where the object O hits the butter zone 51 and where $v_{max}$ is the maximum velocity. Assuming that $v_{final}$ equals zero, the equation can be rearranged to solve for the maximum velocity in the direction of the object $\Delta r$ that guarantees the ability to stop without exceeding $a_{max}$. Accordingly, $v_{max}$ can be calculated as:

$$v_{max} = \sqrt{\Delta r a_{max}}$$

Imaginary numbers can be avoided by using the absolute value of the root function before calculating, such as by using the signum function of the contents of the root function to identify the direction of the maximum velocity. Thus, $v_{max}$ can be represented as the following:

$$v_{max} = \text{sgn}(\Delta r a_{max})\sqrt{|\Delta r a_{max}|}$$

Figure 3A:
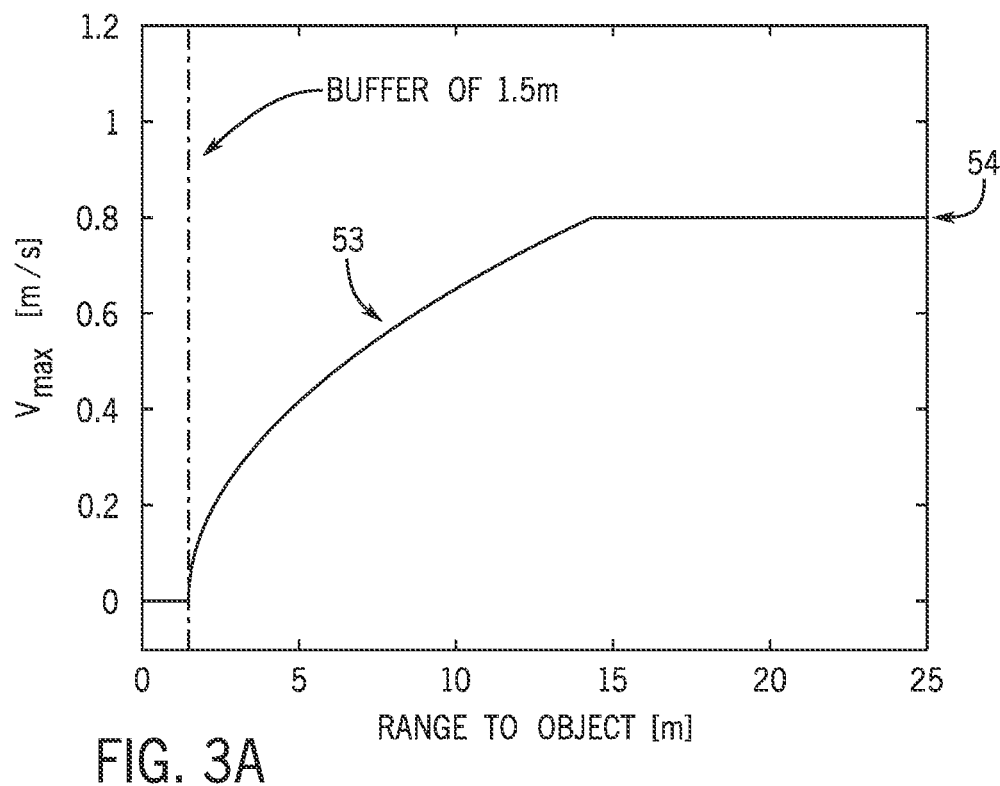
FIGS. 3A and 3B are graphs showing exemplary velocity limit ranges for an exemplary buffer distance of 1.5 meters.
Figure 3B:
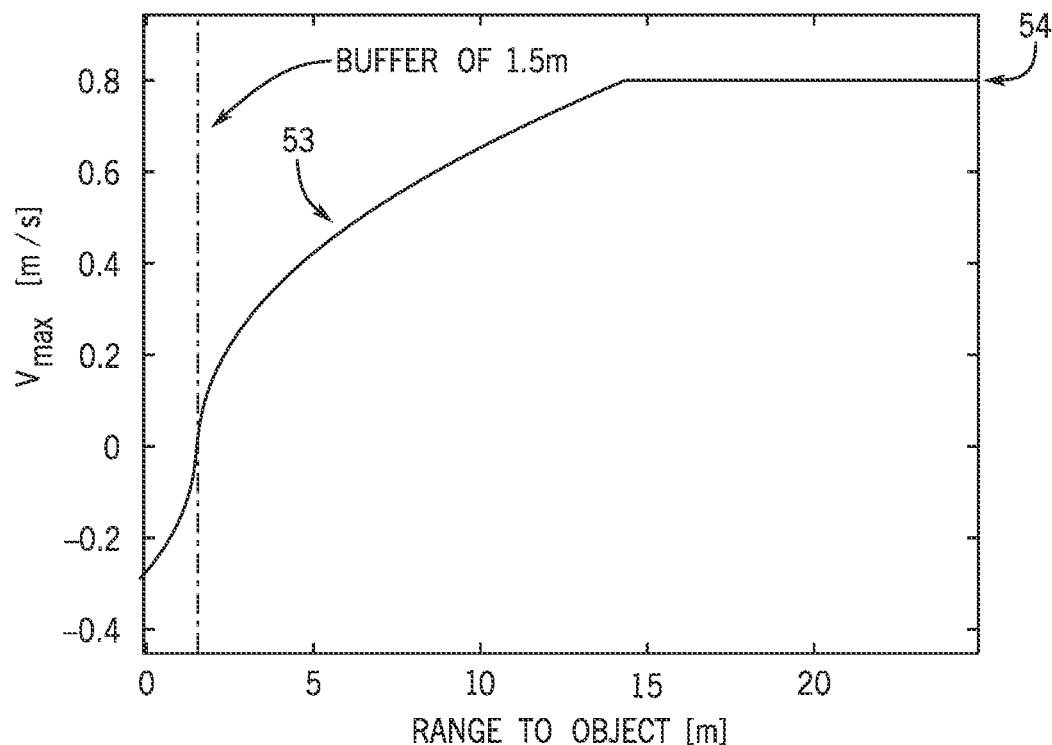

FIGS. 3A and 3B are a graphs depicting velocity limit with respect to object distance for exemplary control scenarios where the preset buffer distance 50 around the marine vessel 10 is 1.5 meters. The velocity limit 53 decreases as the marine vessel 10 approaches the object O. When the marine vessel is 15 meters from the object O, for example, the velocity limit 53 in the direction of the object O is at a maximum of 0.8 m/s, and that velocity limit decreases as the marine vessel 10 moves towards the object O such that the velocity limit is zero when the marine vessel is at the buffer distance 50 of 1.5 meters from object O. Thus, inside the buffer zone 51, the user does not have authority, such as via the joystick or other steering and thrust input device, to move the marine vessel 10 closer to the object. Accordingly, no thrust will be provided in the direction of the object O if the marine vessel is less than or equal to the preset buffer distance 50 from the object O, even if the user provides input (such as via the joystick 30) instructing movement in the direction of the object O.

In the embodiment represented at FIG. 3A, the velocity limit 53 in the direction of the object may remain at zero while the buffer distance 50 is violated. Thereby, user authority will be limited such that user control input (e.g. via the joystick) to move the marine vessel 10 in the direction of the object will not be acted upon by the propulsion system 20. In other embodiments, the velocity limit 53 may be zero at the buffer distance 50 and then become negative once the distance to the object O is less than the buffer distance. In the scenario in FIG. 3B, the velocity limit 53 will become negative when the distance to the object is less than 1.5 meters and may become progressively more negative, increasing propulsion in the opposite direction of the object in order to propel the vessel away from the object O. The control system may be configured such that the negative velocity limit 53 is converted to a control command to effectuate a thrust away from the object O so that the marine vessel 10 is maintained at least the buffer distance 50 away from the object O.

As also illustrated in FIGS. 3A and 3B, a maximum propulsion authority 54 may be utilized, which sets a maximum for the velocity limit 53. The maximum propulsion authority 54 may be a predetermined value based on handling, comfort, or safety metrics for the relevant mode of operation where the disclosed velocity control is implemented, such as in a joysticking mode or a docking mode of operation where the control algorithms are configured to provide precise propulsion control of the marine vessel 10 operating at relatively low velocities. In the depicted examples, the maximum propulsion authority 54 is 0.8 m/s; however, faster or slower maximum speeds may be implemented depending on the vessel configuration and the expected control demands for the relevant mode of operation. The +/−yaw propulsion directions may have a maximum propulsion authority value in radians. Furthermore, different maximum propulsion authority values may be associated with different directions. For instance, the maximum propulsion authority value for the positive Y, or forward, direction may be higher than the maximum propulsion authority value for the negative Y, or backward, direction.

In one embodiment, the proximity sensor system, e.g., the proximity sensors 72-78 in concert with the sensor processor 70, may be configured to generate a most important object (MIO) dataset identifying a select set of closest proximity measurements. For example, the MIO dataset may identify distances in each of the six directions that a boat has control authority—+/−X, +/−Y, and +/−yaw directions—thereby informing the navigation controller of navigation constraints based on the location of objects O around the marine vessel. For example, the closest proximity measurements may be identified based on one or more simplified two-dimensional vessel outlines representing the vessel hull. In such an embodiment, the MIO dataset may be calculated using the simplified boat profile and low-computation-load geometry to generate the MIO dataset identifying the closest proximity measurements in each possible direction of movement of the marine vessel 10. In one embodiment, the MIO dataset includes six values specifying one closest proximity measurement in each of the +/−X directions, +/−Y directions, and +/−yaw rotational directions.

In certain embodiments, the MIO dataset may always contain six values defining the closest proximity measurements in each of the aforementioned directions of movement. Thus, if no proximity measurements are detected in a particular direction, then a default large number may be provided which will be interpreted as non-limiting in the respective direction. To provide just one example, the default distance in the +/−yaw direction may be +/−180°. The navigation controller (e.g. controller 24) will interpret that default large rotation angle range to mean that the vessel can turn 180° without colliding with any object in the yaw direction. The default large number may be greater than 180° (even as large as 360°), or may be smaller than 180°, such as 90°. The default large value in the X and Y directions may be a large, such as 10,000 meters, 50,000 meters, or more. In any such case, the default distance is large enough that the navigation controller will not limit any vessel movement based on the relevant default MIO data point. In other embodiments, the system 20 may be configured such that less than six numbers may be provided for the MIO dataset. Thus, where no proximity measurements 90 are detected in a particular direction, a null value or no value may be reported as part of the MIO dataset.

Figure 4:
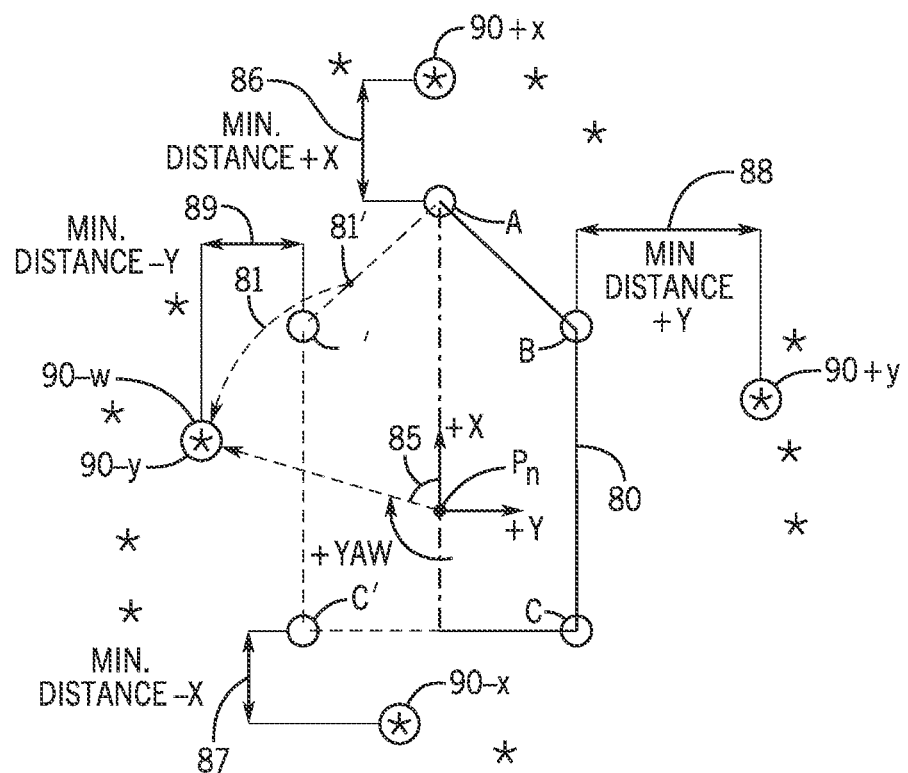
FIG. 4 is a diagram illustrating an exemplary calculation of a most important object (MIO) dataset identifying closest proximity measurements.

As illustrated in FIG. 4, the two-dimensional vessel outline may be represented as a set of Cartesian points defined with respect to a point of navigation $P_n$. For instance, the two-dimensional vessel outline may be a set of five points forming the shape of a pentagon around $P_n$, where the center point (00) is the navigation point $P_n$ (i.e., the center of navigation) of the marine vessel. Referring to the example at FIG. 2, the three Cartesian points include the front point A, starboard corner point B, starboard back point C, the port corner point B', and the port back point C'.

In FIG. 4, the two-dimensional vessel outline 80 is presented with respect to multiple proximity measurements 90. The four linearly-closest proximity measurements $90_{+x}$, $90_{-x}$, $90_{+y}$, and $90_{-y}$ are determined as the four closest proximity measurements in each direction along the X-axis and the Y-axis, sequentially. For example, the proximity measurement with the minimum distance 86 in the positive X direction from the front-most point of the vessel model, the front point A, is determined as the closest proximity measurement $90_{+x}$. The proximity measurement 90 with the minimum distance 87 in the negative X direction as measured along the X-axis from the X-value of the back points C and C' is the closest proximity measurement $90_{-x}$. The proximity measurement 90 with the minimum distance 88 in along the Y-axis from the Y-value of starboard points B and C is the closest proximity measurement $90_{+y}$. The minimum distance 89 in the direction of the negative Y-axis from the Y-values of the port points B' and C' is the closest proximity measurement $90_{-y}$.

In addition to the linearly-closest proximity measurements, rotationally-closest proximity measurements may also be calculated, which are the closest proximity measurements in the positive yaw direction and the negative yaw direction. In other words, the rotationally-closest proximity measurements include the point that will first touch the two-dimensional vessel outline 80 as it rotates about the point of navigation $P_n$ in the positive yaw direction (clockwise) and the point that will first touch the two-dimensional vessel outline 80 as it rotates about $P_n$ in the negative yaw direction (counterclockwise). The two rotationally-closest proximity measurements may be used to identify the yaw angles to which the marine vessel can rotate without colliding with an object. The smallest positive yaw angle and smallest negative yaw angle may be included in the MIO dataset so that the vessel navigation controller can properly limit the movement of the marine vessel to avoid collision.

For those proximity measurements 90 near the marine vessel 10, at least one yaw path will be calculated between the respective proximity measurement and one or more intersection points on the two-dimensional vessel outline 80. Referring to FIG. 4, one or more yaw paths 81 will be calculated for each nearby proximity measurement 90, including each of the linearly-closest proximity measurements $90_{+x}$, $90_{-x}$, $90_{+y}$, and $90_{-y}$. For each yaw path 81 determined for each proximity measurement 90, a yaw angle 85 is determined, which may be a positive yaw angle or a negative yaw angle (depending on the path 81 of rotation). The smallest positive and negative yaw angles 85 are included in the MIO dataset as the closest positive yaw direction proximity measurement $90_{+w}$ and the closest negative yaw direction proximity measurement $90_{-w}$. For calculating the yaw path for each proximity measurement 90, a circle may be defined having a radius between the point of navigation $P_n$ and the respective proximity measurement 90. FIG. 4 represents one such calculation, where the proximity measurement circle is defined for calculating the yaw path 81. At least one intersection point 81' is identified between the proximity measurement path 81 and the two-dimensional vessel outline 80.

Velocity limits are then calculated based on the MIO dataset providing the closest proximity measurements in each of the +/−X direction, +/−Y direction, and +/−yaw direction. For example, a velocity limit may be calculated for each point in the MIO dataset, thus resulting in continual calculation of a velocity limit in each of the +/−X directions, +/−Y directions, and +/−yaw directions.

Figure 5:
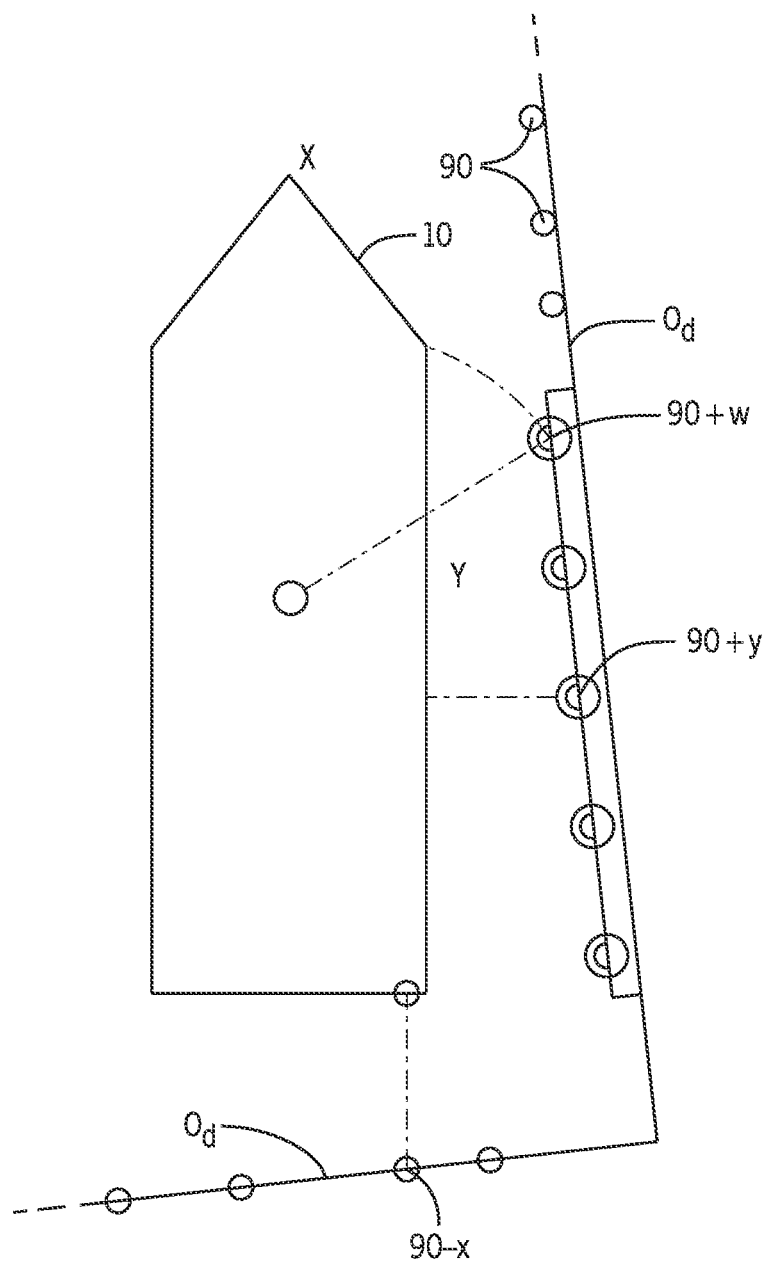
FIG. 5 illustrates an exemplary scenario where velocity limits are calculated in the direction of each of multiple objects.

In FIG. 5, the marine vessel 10 is shown approaching the object $O_d$, which is a dock where multiple proximity measurements 90 are identified defining the dock. Several closest proximity measurements are also identified, including a closest proximity measurement in the negative X direction $90_{-x}$, a closest proximity measurement in the positive Y direction $90_{+y}$, and a closest proximity measurement in the +yaw rotational direction $90_{+w}$. As the marine vessel 10 approaches the dock $O_d$, velocity limits are calculated based on those identified closest proximity points. Three exemplary velocity limits are illustrated, which include a negative X direction velocity limit, the positive Y direction velocity limit, and the positive yaw rotational velocity limit. For example, each velocity limit may be calculated using the velocity limit formula described above, where $\Delta r$ is each distance measurement adjusted by the preset buffer distance 50. The formula can be equally applied to rotational (yaw) velocity control by using angular velocity and acceleration instead of linear velocity and acceleration.

In certain embodiments, the marine vessel may be configured to autonomously control the propulsion devices 12a, 12b to maintain at least the predetermined buffer distance 50 between the marine vessel 10 and an object O. Thus, where the buffer zone 51 is violated, the relevant controller executing velocity control software 25, the propulsion controller, may generate instructions to the propulsion devices 12a, 12b to move the marine vessel such that the buffer zone 51 is not violated. Where an object O, such as a dock $O_d$ or seawall, spans the length of the marine vessel 10, positive and negative yaw direction limits will come into play, where zero or negative yaw velocity limits in one or the other direction will result in propulsion control instructions that rotate the marine vessel so as not to violate the buffer zone 51.

The positive and negative yaw direction limits and control instructions to maintain the buffer zone 51 will result in the marine vessel self-aligning with the object O, such as a seawall or a dock. The propulsion controller, such as the central controller 24 executing velocity control software 25, will operate to rotate the marine vessel to align with the dock $O_d$ because a thrust instruction causing rotation of the vessel will be generated if a portion of the marine vessel becomes closer to the object $O_d$ and thus violates a portion of the buffer zone 51. In such an instance, the relevant yaw velocity limit $90_{+w}$, $90_{-w}$ will become negative, which will result in a thrust instruction to rotate the marine vessel to move the closest end of the vessel away from the object. Referring to FIG. 5, if the velocity limit $90_{+w}$ becomes negative, then the marine vessel 10 will be rotated counterclockwise until the proximity measurement $90_{+w}$ in the +yaw direction is at least the buffer distance from the relevant object point. Thereby, the marine vessel 10 is caused to align with the length of the dock $O_d$ such that neither of the yaw velocity limits are negative. Accordingly, with respect to the scenario depicted in FIG. 5, if a user were to instruct lateral movement towards the object O, such as by holding the joystick 30 laterally toward the dock $O_d$, the propulsion controller would cause the marine vessel to self-align with the dock $O_d$ and to maintain a clearance from the dock equal to the preset buffer distance 50.

Similarly, where a marine vessel is being steered within a tight space, such as in a slip, the propulsion controller will operate to maintain the buffer distance on all sides of the marine vessel where the object O appears. Where the marine vessel is being positioned in a slip or a similar tight space, the buffer distance on two sides of the marine vessel must be violated. The controller 70 implementing the autonomous thrust instructions based on negative velocity limits, as described above, will act to center the marine vessel 10 within the objects appearing on either side. There, a negative thrust control will be generated based on objects on opposing sides of the marine vessel, such as both in the positive Y direction and the negative Y direction. Where the marine vessel ventures closer to the object on one side than the other, the negative thrust instruction in the opposite direction of the closer side will be greater than that generated in the opposite instruction. Thus, the thrust instructions generated from the negative velocity limits will only be executed if the marine vessel is closer to an object on one side than the other, and the velocity limits will tend to cancel each other out and cause the marine vessel to center within the objects on either side.

The velocity limit calculation is executed by one or more controllers with the control system 20. Referring again to FIG. 1, the sensor processor 70 receives the proximity measurement from each of the proximity sensors 72-78, and in such an embodiment may be configured with software to perform the MIO dataset identification and may provide the MIO dataset to a controller performing the velocity limit calculation. The controller performing the velocity limit calculation is referred to herein as the propulsion controller, which may be any controller configured to execute velocity control software 25 having computer-executable instructions to cause that controller to perform as described herein. In FIG. 1, the propulsion controller may be, for example, the CCM 24 storing and executing velocity control software instructions 25. In such an embodiment, each of the sensor processor 70 and the central controller 24 includes its own storage system comprising memory and its own processing system that executes programs and accesses data stored in the respective storage system.

In other embodiments, the sensor processor 70 may store and execute the velocity control software 25 and thus may perform as the propulsion controller. In still other embodiments, a dedicated, special-purpose propulsion controller may be provided, such as a computing system storing and executing the velocity control software 25 and configured to receive proximity measurements, such as from the sensor processor 70, and to output velocity limits, which in various embodiments may be provided to the CCM 24 or to each PCM 26a, 26b. In still other embodiments, the proximity assessment functionality described herein as belonging to the sensor processor 70 and the velocity control functionality may both be performed by a single controller, such as the central controller 24.

Given the large amount of proximity data produced by the proximity sensors 72-78, the connection between the sensors 72-78 and the sensor processor 70 may be via a dedicated bus or network connection. This dedicated bus or network connection is separate from the vessel network in order to allow transmission of a large amount of proximity measurement data (and, in some embodiments, IMU data) to the sensor processor 70. Such massive data transmission may not be possible on a typical vessel network, such as a CAN bus or wireless network where multiple devices are communicating. The sensor processor 70 may be configured to communicate filtered proximity data on the vessel network, such as a CAN bus or wireless network, such as the MIO dataset. In still other embodiments, a dedicated communication link may be provided between the sensor processor 70 and the propulsion controller, such as the central controller 24.

Figure 6:
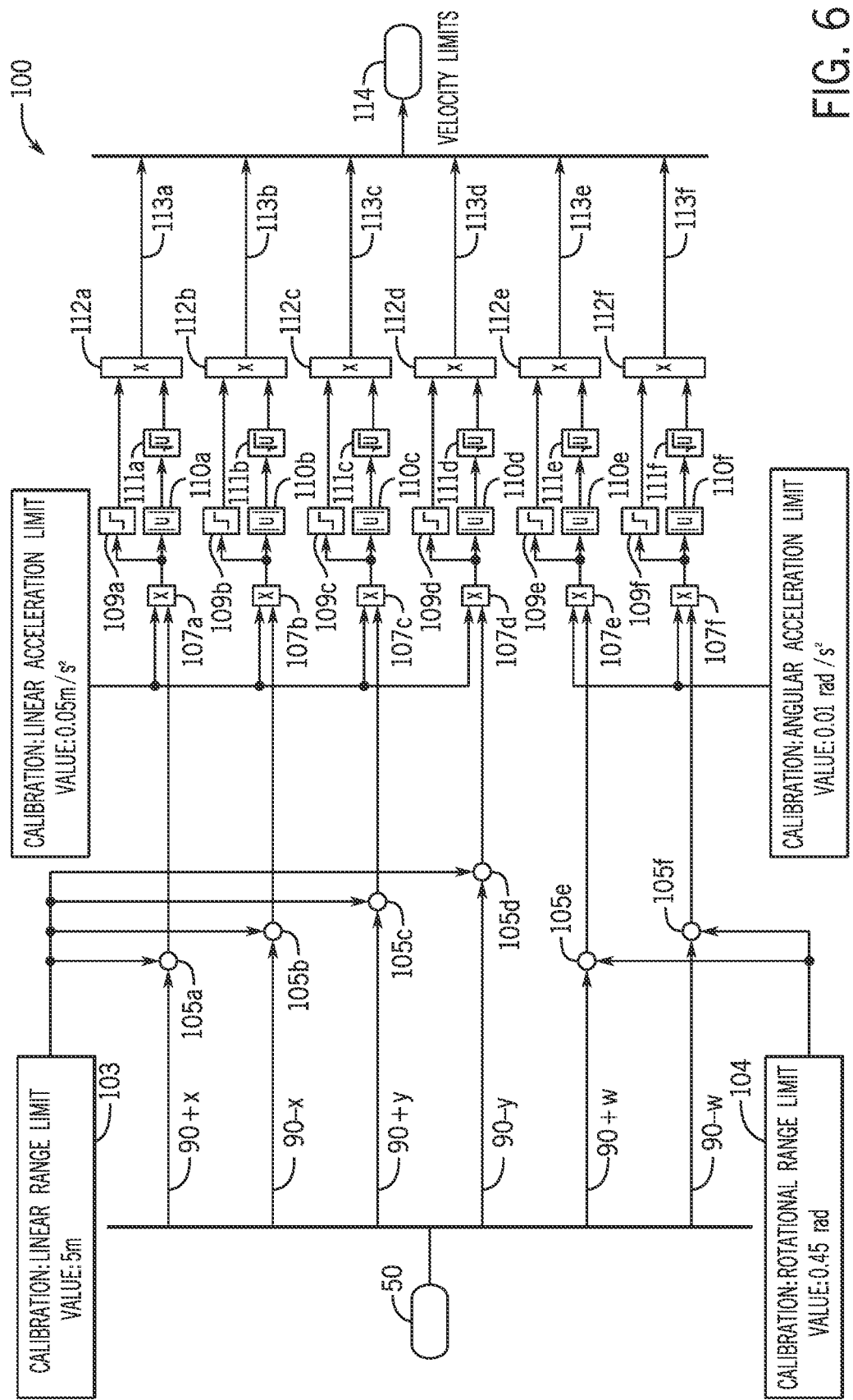
FIG. 6 is a flowchart exemplifying velocity limit calculations according to one embodiment of the disclosure.

FIG. 6 depicts one embodiment of a propulsion control method 100 implementing proximity-based velocity limiting as described herein. Six closest proximity measurement values are provided, one in each of the +/−X direction, +/−Y direction, and +/−yaw direction. The preset buffer distance 50, or "minimum range" that must be maintained from an object, is defined and provided, where the linear range limit is provided at block 103 and the rotational range limit is provided at block 104. In the example, the linear range limit is 5 m. Note that the range limit in the angular direction is an angular measurement, which in the example is 0.45 radians. The minimum range is then either added or subtracted from the respective distance value depending on the direction (and thus the sign) of the respective distance value. Summing blocks 105a-105f are each configured to assign the appropriate sign to the preset buffer value.

The velocity limit is then calculated accordingly based on the distance values and the maximum acceleration set for the marine vessel. In the example, the linear maximum acceleration is 0.05 m/s² and the angular acceleration limit is 0.01 rad/s². The maximum linear acceleration is provided to each of blocks 107a-107d, which is the maximum acceleration in the relevant Cartesian direction. Similarly, the maximum angular acceleration is provided to each of blocks 107e and 107f, which is the maximum acceleration in the relevant positive or negative yaw direction. At block 107 the relevant distance range (e.g. Δr described above) is multiplied by the corresponding maximum acceleration. Before the absolute value is taken of the outputs at blocks 110a-110f, the sign of the relevant velocity calculation is determined at signum function blocks 109a-109f. The square root of the absolute value is then calculated at blocks 111a-111f. The velocity limit is then determined at blocks 112a-11f for each of the six directions, and all six velocity limit values 113a-113f are outputted at block 114.

Figure 7:
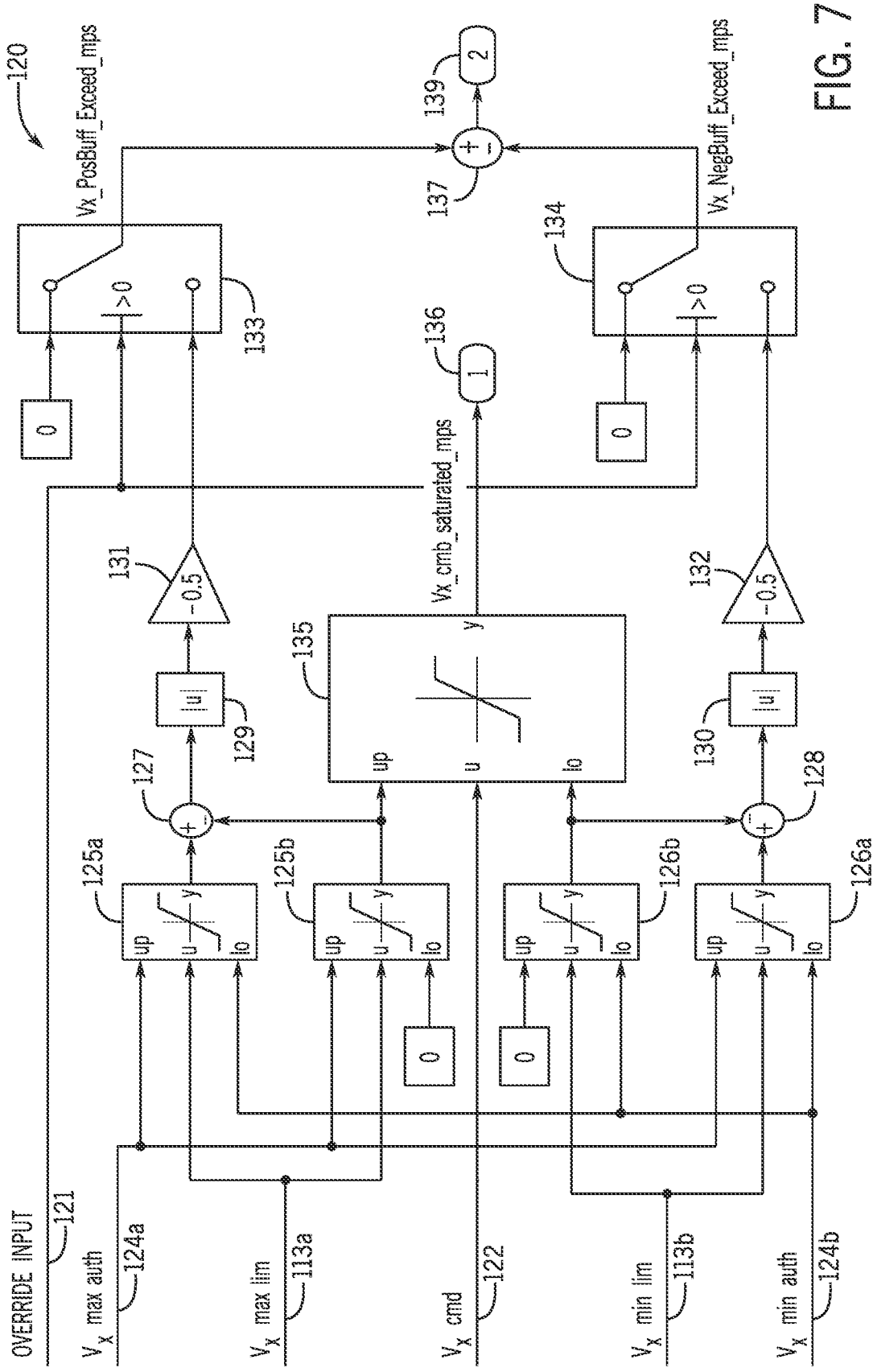
FIG. 7 is a flowchart exemplifying calculation of a velocity command in a direction of an object based on a velocity limit.

FIG. 7 depicts an exemplary method 120 of velocity limit implementation. FIG. 7 exemplifies velocity command determination in the positive and negative X directions based on the +/−X velocity limits 113a and 113b. The velocity limit is calculated based on the user control input 122. In the depicted example, a positive or negative X-direction propulsion command is determined based on the user control input 122 (which in the depicted embodiment is an initial velocity value associated with the joystick position), +/−X velocity limits 113a and 113b, and the maximum propulsion authority values 124a and 124b in the positive and negative X directions. If the user control input 122 is positive, then a positive X direction propulsion command is generated; if the user control input 122 is negative, then a negative X direction command is generated. In the depicted example, the velocity limit values 113a-113f are unbounded values calculated based on the respective closest proximity measurement. The calculated velocity limits 113a or 113b is limited, or capped, based on the maximum propulsion authority 124a, 124b at blocks 125a, 125b and 126a, 126b. In particular, a capped velocity limit in the positive X direction is calculated at blocks 125a and 125b. At block 125a, the velocity limit is bounded by both the positive and negative X-direction authority values 124a and 125b, meaning that the velocity limit outputted from block 125a may be negative where the marine vessel is less than the buffer distance from the object. At block 125b, however, the velocity limit is bounded between the maximum authority 124a in the positive X direction and zero, meaning that the outputted velocity limit will be zero when the proximity measurements are less than or equal to the buffer distance. The negative X direction capped velocity limit determinations are similar, where capped velocity limits in the negative X direction are calculated at blocks 126a and 126b.

Note that the output of block 126b will be negative or zero depending whether the proximity values are outside or inside the buffer zone, and the output of block 126a may be negative, zero, or positive depending whether the proximity values are outside, at, or inside the buffer zone.

The outputs of blocks 125b and 126b, which are the zero-bounded velocity limits, are provided to block 135, where they are implemented to limit the user control input 122. Depending on the sign of the user control input 122, either one of the positive velocity limit 125b or the negative velocity limit 126b is used at block 135 to limit the user input authority. The resulting velocity command based on the user control input 122 is outputted at block 136. In an embodiment where no autonomous control is implemented, only this zero-bounded portion of the control diagram may be implemented to deprive the user authority to move the marine vessel closer to the object O than is permitted.

In an embodiment where autonomous control is provided, the output of blocks 125a and 126a may be utilized to determine an autonomous velocity command. The outputs of blocks 125a and 125b or 126a and 126b are summed at blocks 127 and 128, respectively. If the buffer zone is not violated then the outputs of the summed blocks will cancel each other out and the output of the summation blocks 127 and 128 will be zero. If the output of the summation block 127, 128 is nonzero, then the buffer zone has been violated and a propulsion command is calculated to move the marine vessel away from the object. The absolute value of the respective summed output is determined at blocks 129 and 130, and a negative gain is applied at blocks 131 and 132. Blocks 133 and 134 are provided to implement a user override, where the autonomous propulsion control to actively maintain the buffer distance is suspended when the user-generated instruction 121 is active, or positive, by setting the output of blocks 133 and 134 to zero. Assuming that the user-generated instruction 121 is not active, the output of block 133 or 134 (whichever is nonzero) is provided to block 137, which reapplies the relevant sign. The resulting propulsion command is outputted at block 139.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A propulsion control system on a marine vessel, the propulsion control system comprising:
   at least one propulsion device configured to propel the marine vessel;
   at least one proximity sensor system configured to generate proximity measurements describing proximity of objects surrounding the marine vessel;
   a control system configured to:
   receive the proximity measurements;
   access a preset buffer distance surrounding the marine vessel;

calculate a velocity limit for the marine vessel in one or more directions of the objects based on a difference between the proximity measurements and the preset buffer distance surrounding the marine vessel so as to progressively decrease the velocity limit as the marine vessel approaches the preset buffer distance from any of the objects; and control the at least one propulsion device such that a velocity of the marine vessel does not exceed the velocity limit in the direction of any of the objects.

2. The system of claim 1, wherein the control system is further configured to calculate each of a positive X direction velocity limit, a negative X direction velocity limit, a positive Y direction velocity limit, and a negative Y direction velocity limit based on the proximity measurements describing proximity of the objects.

3. The system of claim 2, wherein the proximity sensor system is configured to identify one closest proximity measurement in each of a positive X direction, a negative X direction, a positive Y direction, and a negative Y direction; and wherein the positive X direction velocity limit is based on the closest positive X direction proximity measurement, the negative X direction velocity limit is based on the closest negative X direction proximity measurement, the positive Y direction velocity limit is based on the closest positive Y direction proximity measurement, and the negative Y direction velocity limit is based on the closest negative Y direction proximity measurement.

4. The system of claim 1, wherein the control system is further configured to calculate each of a positive yaw direction velocity limit and a negative yaw direction velocity limit based on the proximity measurements describing proximity of the objects.

5. The system of claim 4, wherein the proximity sensor system is further configured to identify one closest proximity measurement in each of a positive yaw direction and a negative yaw direction; and wherein the control system is further configured to calculate each of a positive yaw direction velocity limit based on the closest positive yaw direction proximity measurement and a negative yaw direction velocity limit based on the closest negative yaw direction proximity measurement.

6. The system of claim 1, wherein the velocity limit is calculated based on a maximum acceleration for the marine vessel, such that the velocity limit in the one or more directions of the objects is calculated to allow the marine vessel to stop at the preset buffer distance without exceeding the maximum acceleration.

7. The system of claim 6, wherein the maximum acceleration for the marine vessel is based on propulsion capabilities of the at least one propulsion device.

8. The system of claim 1, wherein the control system is further configured to maintain at least the preset buffer distance between the marine vessel and each of the objects.

9. The system of claim 8, further comprising at least one input device manipulatable to provide user control input to control a movement direction and velocity of the marine vessel;

wherein the velocity limit limits user input authority over propulsion output in at least one of the one or more directions by the at least one propulsion device based on the proximity measurements and user control input via the input device so as to maintain the marine vessel at least the preset buffer distance from each of the objects surrounding the marine vessel; and wherein the velocity limit is zero in a direction of any of the objects when the marine vessel reaches the preset buffer distance from that object.

10. The system of claim 8, wherein the velocity limit in the direction of at least one of the objects is negative when the marine vessel is less than the preset buffer distance from the at least one of the objects.

11. The system of claim 10, wherein the control system is further configured to automatically control the at least one propulsion device to effectuate a thrust away from the at least one of the objects based on the negative velocity limit until the marine vessel reaches the preset buffer distance from the at least one of the objects.

12. The system of claim 1, wherein the control system is configured such that it causes the marine vessel to automatically align with at least one of the objects in response to a user input steering the marine vessel toward the at least one of the objects when the at least one of the objects spans a length of the marine vessel.

13. A marine propulsion control method comprising:
receiving proximity measurements measured by one or more proximity sensors on a marine vessel, wherein the proximity measurements describe proximity of objects surrounding the marine vessel;
accessing a preset buffer distance surrounding the marine vessel;
calculating a velocity limit for the marine vessel in one or more directions of the objects based on a difference between the proximity measurements and the preset buffer distance surrounding the marine vessel so as to progressively decrease the velocity limit as the marine vessel approaches the preset buffer distance from any of the objects; and
controlling at least one propulsion device on the marine vessel such that a velocity of the marine vessel does not exceed the velocity limit in the direction of any of the objects.

14. The method of claim 13, further comprising limiting user input authority over propulsion output in at least one of the one or more directions by at least one propulsion device to the velocity limit so as to maintain the marine vessel at least the preset buffer distance from the objects, wherein the velocity limit is zero in the at least one of the one or more directions when the marine vessel is at the preset buffer distance from a corresponding one of the objects.

15. The method of claim 13, further comprising controlling the at least one propulsion device to maintain at least the preset buffer distance between the marine vessel and each of the objects.

16. The method of claim 15, wherein the velocity limit calculated in the direction of at least one of the objects is negative when the marine vessel is less than the preset buffer distance from that object.

17. The method of claim 16, further comprising automatically controlling the at least one propulsion device to effectuate a thrust away from the at least one of the objects based on the negative velocity limit until the marine vessel reaches the preset buffer distance from that object.

18. The method of claim 13, wherein calculating the velocity limit for the marine vessel in one or more directions includes calculating each of a positive X direction velocity limit, a negative X direction velocity limit, a positive Y direction velocity limit, and a negative Y direction velocity limit.

19. The method of claim 13, wherein calculating the velocity limit for the marine vessel in one or more directions includes calculating each of a positive yaw direction velocity limit and a negative yaw direction velocity limit.

20. The method of claim 13, further comprising identifying a set of closest proximity measurements, including a closest proximity measurement in each of a positive X direction, a negative X direction, a positive Y direction, a negative Y direction, a positive yaw direction, and a negative yaw direction; and wherein the velocity limit for the marine vessel in one or more directions are calculated based on the set of closest proximity measurements.

\* \* \* \* \*